United States Patent
Chang

(10) Patent No.: US 10,442,628 B1
(45) Date of Patent: Oct. 15, 2019

(54) AXLE DISTANCE ADJUSTMENT DEVICE OF CONVEYOR-DRIVEN FABRIC DYEING MACHINE

(71) Applicant: Chi-Lung Chang, Taoyuan (TW)

(72) Inventor: Chi-Lung Chang, Taoyuan (TW)

( * ) Notice: Subject to any disclaimer, the term of this patent is extended or adjusted under 35 U.S.C. 154(b) by 0 days.

(21) Appl. No.: 16/180,025

(22) Filed: Nov. 5, 2018

(51) Int. Cl.
 *B65G 21/14* (2006.01)
 *B65G 23/44* (2006.01)
 *B65G 39/09* (2006.01)

(52) U.S. Cl.
 CPC ............ *B65G 21/14* (2013.01); *B65G 23/44* (2013.01); *B65G 39/09* (2013.01)

(58) Field of Classification Search
 CPC ..................................................... B65G 21/14
 USPC ........................................................ 198/812
 See application file for complete search history.

(56) References Cited

U.S. PATENT DOCUMENTS 5,117,961 A * 6/1992 Nicholson ............. B65G 47/54
 198/369.5

* cited by examiner

*Primary Examiner* — Gene O Crawford
*Assistant Examiner* — Lester Rushin, III
(74) *Attorney, Agent, or Firm* — Leong C. Lei

(57) ABSTRACT

An axle distance adjustment device is provided for a conveyor-driven fabric dyeing machine and includes a conveyor belt in the form of an endless loop arranged inside a machine body and a fixed roller and a movable roller respectively arranged at two ends of the conveyor belt. The fixed roller has a rotary axle having two ends mounted through bearings to bearing seats mounted on sidewalls of the machine body. The movable roller has a rotary axle having two ends mounted through bearings to position-adjustable bearing seats, which are coupled to hollow bearing seat bases mounted to the sidewalls of the machine body. The position-adjustable bearing seats are attachable to the hollow bearing seat bases at different locations so that an axle distance between the rotary axle of the fixed roller and the rotary axle of the movable roller is changed for adjustment of tightness of the conveyor belt.

2 Claims, 7 Drawing Sheets

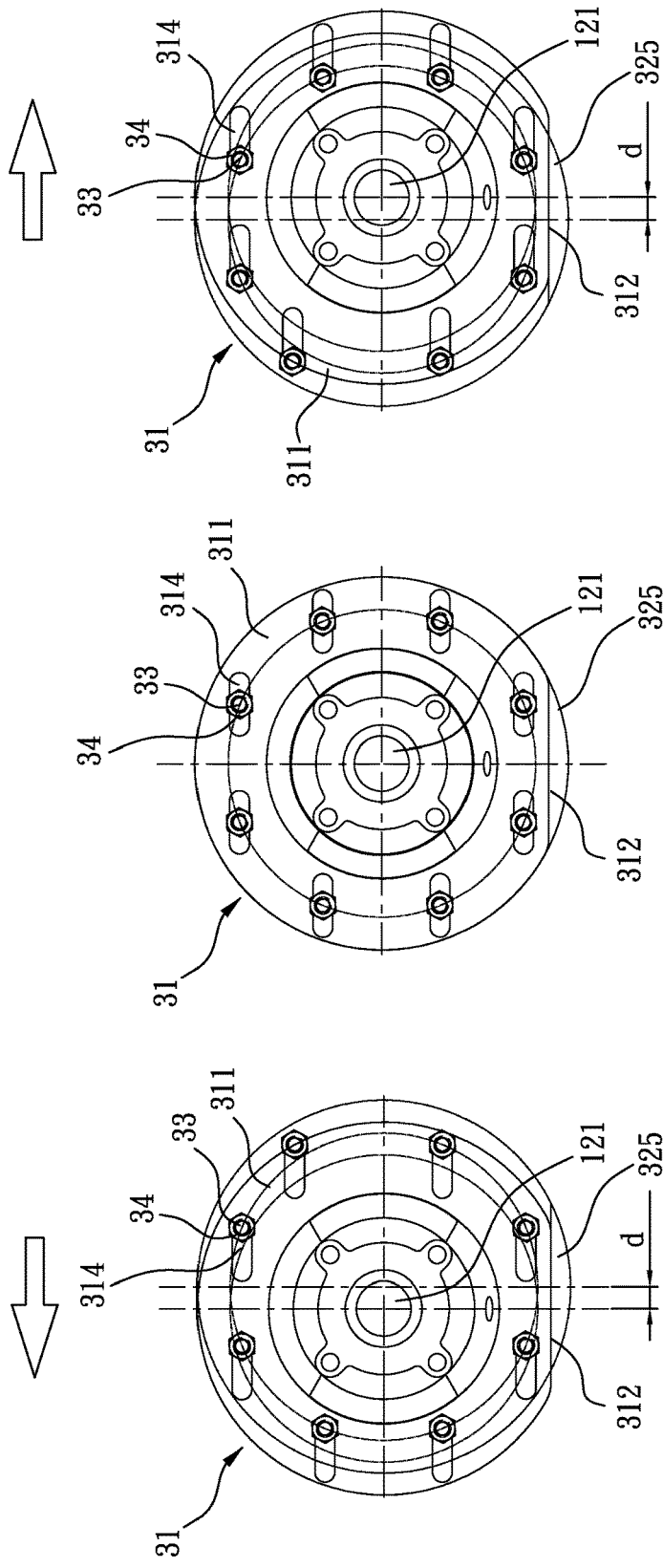

AXLE DISTANCE ADJUSTMENT DEVICE OF CONVEYOR-DRIVEN FABRIC DYEING MACHINE

(a) TECHNICAL FIELD OF THE INVENTION

The present invention relates generally to a fabric dyeing machine, and more particularly to an axle distance adjustment device that allows for efficient and convenient adjustment of tightness of a conveyor belt that is arranged inside the dyeing machine in case of slackening of the conveyor belt caused by wear and abrasion.

(b) DESCRIPTION OF THE PRIOR ART

Taiwan Patent Application No. 86111350, which is an early invention of the present inventor, discloses a dyeing machine including a conveyor device, of which the structure comprises a conveyor device arranged inside a machine body of the dyeing machine to help convey or advance fabric to circulate through the machine.

Since the conveyor device is arranged inside the machine body of the dyeing machine and since the rotary axles of rollers of the conveyor are fixed, a length of a chain of the conveyor may not be readily controlled and may get over-tight or over-loose, leading to poor installation and improper operation. Further, the conveyor device, after having been put into operation of a period of time, might suffer wearing and abrasion of parts thereof. Since the rollers at two ends of the conveyor device are generally immobile and fixed, meaning the distance between axles thereof is not adjustable, slackening of the conveyor belt may readily occur, making it adverse to the operation and movement of the conveyor belt. Skilled persons must be retained to adjust the length of the chain, or supporting measures must be provided at proper locations of the chain in order to adjust and control the tightness thereof, for improving slackening issues of the conveyor belt.

SUMMARY OF THE INVENTION

An objective of the present invention is to provide a solution that overcomes the problem that a conveyor belt involved in a conventional fabric dyeing machine may get excessively tight or excessively loose resulting from being undesired lengthening or shortening of the conveyor belt caused by wearing or abrasion and that allows for adjustment of the conveyor belt to an optimum length to ensure more stable and smoother operation of the conveyor belt, without being interfered with by chain detachment or excessive wearing.

The present invention provides an axle distance adjustment device for use with a conveyor-driven fabric dyeing machine, of which the technical solution comprises: a machine body, which has an interior space; one or multiple conveyor devices, which are arranged in the interior space of the machine body. The conveyor device comprises a conveyor belt in the form of an endless loop, a movable roller arranged at one end of he conveyor belt, and a fixed roller arranged at an opposite end of the conveyor belt. The movable roller is mounted to a rotary axle, and the fixed roller is mounted to another rotary axle. The rotary axle of the fixed roller is mounted, through bearings, to a side wall of the machine body in a manner of being rotatable but fixed in position. The movable rotary axle is mounted, through bearings, to a side wall of the machine body in a manner of being rotatable and position adjustable. The movable rotary axle has two ends respectively extending through and coupled to central holes of hollow bearing seat bases respectively mounted to two opposite side walls of the machine body to mate with bearing seats that are movable relative to the hollow bearing seat bases and mounted thereto so that the movable rotary axle is rotatable with the bearings in the bearing seats. The position-adjustable bearing seat and the hollow bearing seat base have surfaces facing and contacting each other and a seal element is provided between the contacting surfaces. Further, shaft seals are arranged between two ends of the rotary axle of the fixed roller and the hollow bearing seats to prevent leaking of liquid or pressure. Shaft seals are also provided between two ends of the rotary axle of the movable roller and the hollow bearing seats to prevent leaking of liquid and pressure. The position-adjustable bearing seat and the hollow bearing seat base may have shapes and sizes that are determined according to the range of adjustability of axle distance and desired sealing therebetween so that sealing can be maintained at the contacting interface therebetween even though the positions of the bearing seat and the bearing base may be changed. As such, the position-adjustable bearing seat and the hollow bearing seat base are arranged to allow for varying relative movement or relative displacement between the position-adjustable bearing seat and the hollow bearing seat base. To ensure movements between the position-adjustable bearing seats and the hollow bearing seat bases being made parallel, and preferably in a horizontal direction, the position-adjustable bearing seat is provided with a horizontal rail and the hollow bearing seat base is provided with a horizontal rail support, so that adjustment of the axle distance between the rotary axle of the movable roller and the rotary axle of the fixed roller can be carried out and then the position-adjustable bearing seat and the hollow bearing seat base are fixed again.

In the dyeing machine of the present invention as described above, when the conveyor device arranged inside the dyeing machine suffers the conveyor belt having an improper chain length or slackening caused by wearing and abrasion, an operator may efficiently and conveniently change and adjust the tightness of the conveyor device to ensure smooth operation of the conveyor belt, reduce wearing and abrasion, and enhance lift spand.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 4 is a schematic view illustrating a condition where centers of the position-adjustable bearing seat and a hollow bearing seat base completely coincide with each other.

FIG. 4A is a schematic view illustrating the position-adjustable bearing seat moving leftward relative to the hollow bearing seat base to lengthen an axle distance according to the present invention.

FIG. 4B is a schematic view illustrating the position-adjustable bearing seat moving rightward relative to the hollow bearing seat base to shorten the axle distance according to the present invention.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
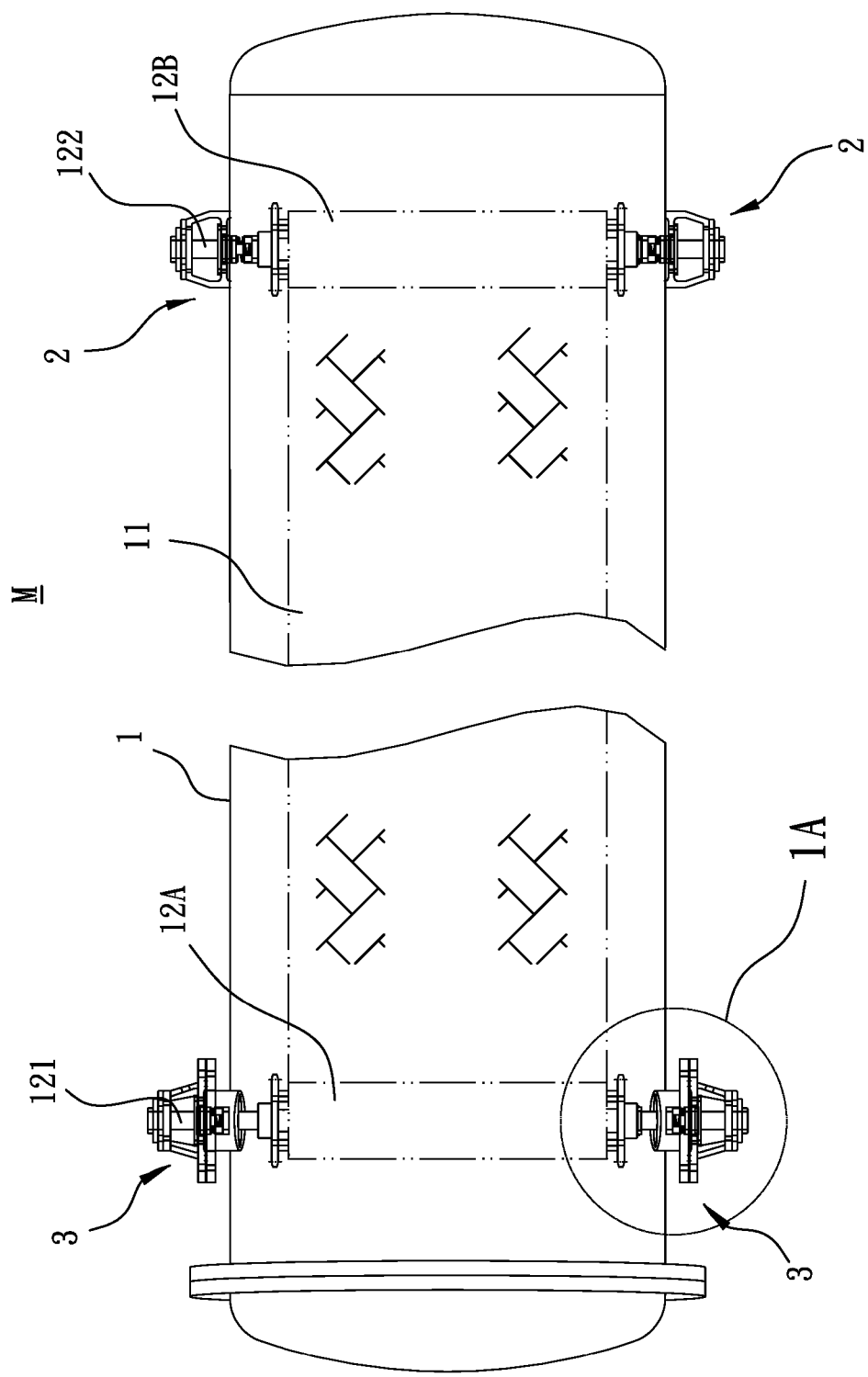
FIG. 1 is a schematic top plan view showing a structure of a fabric dyeing machine according to the present invention.
Figure 1A:
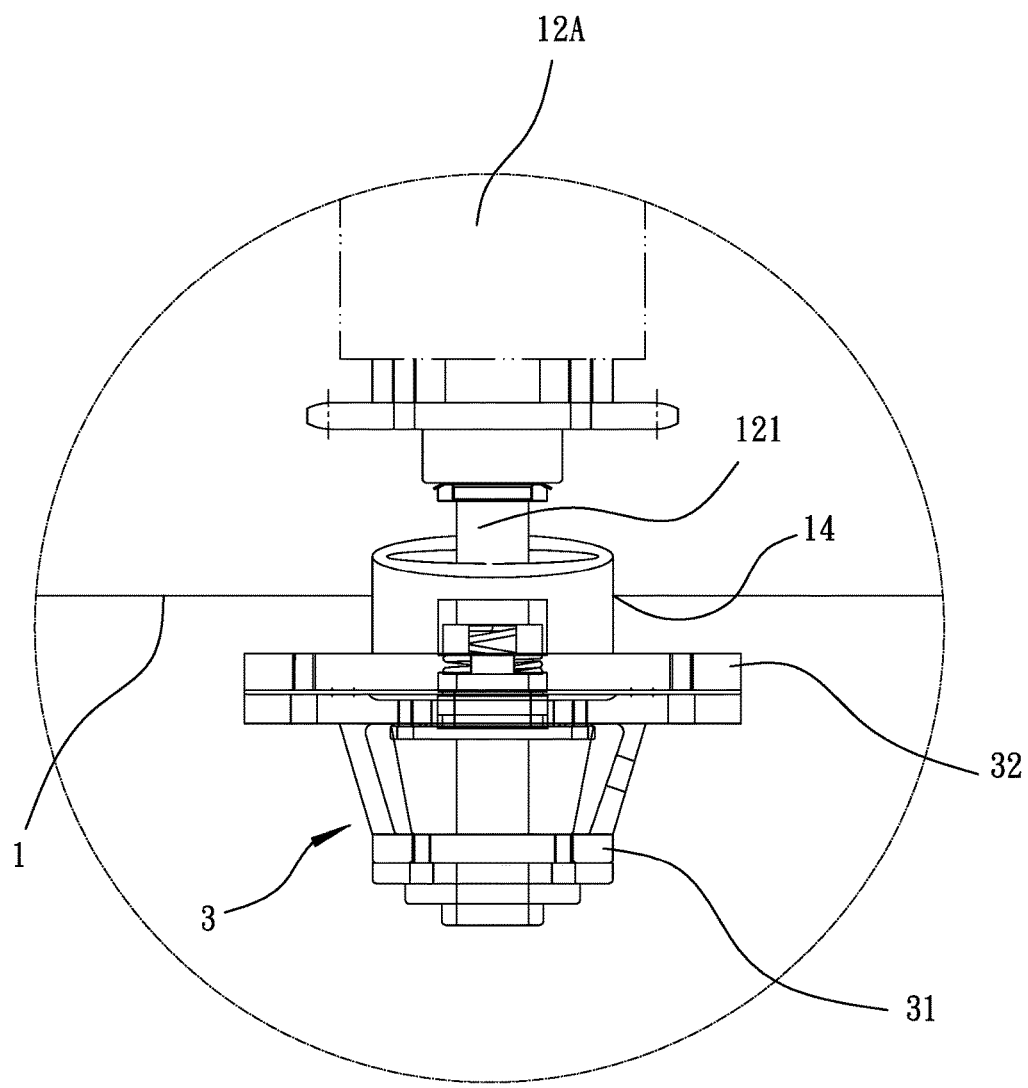
FIG. 1A is an enlarged view of a circled portion 1A of FIG. 1.

As shown in FIG. 1, the present invention provides a conveyor-driven fabric dyeing machine M, which comprises a machine body 1 having an interior space and a conveyor device arranged in the interior space of the machine body 1. The conveyor device comprises a conveyor belt 11 in the form of an enclosing loop, a movable roller 12A arranged at one end of the conveyor belt 11, and a fixed roller 12B arranged at an opposite end of the conveyor belt 11. The movable roller 12A has two opposite ends each of which is provided, at a center thereof, with a rotary axle 121. The fixed roller 12B has two opposite ends, each of which is provided, at a center thereof, with a rotary axle 122. The two rotary axles 122 are each mounted to a side wall of the machine body 1 by means of a fixed roller axle mounting device 2, so that the rotary axle 122 is mounted to the side wall of the machine body in a position-fixed but rotatable manner. The two rotary axles 121 are each mounted to a side wall of the machine body 1 by means of a movable roller axle mounting device 3, so that the rotary axle 121 is allowed to rotate relative to the machine body 1 and also move relative to the machine body 1 to change a position thereof. Specifically, the fixed roller axle mounting device 2 comprises a bearing seat that is fixed to the side wall of the machine body and the rotary axle 122 of each of the two ends of the fixed roller 12B is mounted, via a bearing, to the bearing seat, so that the fixed roller 12B and the rotary axles 122 are rotatable but are not allowed to move or displace relative to the machine body.

Figure 2:
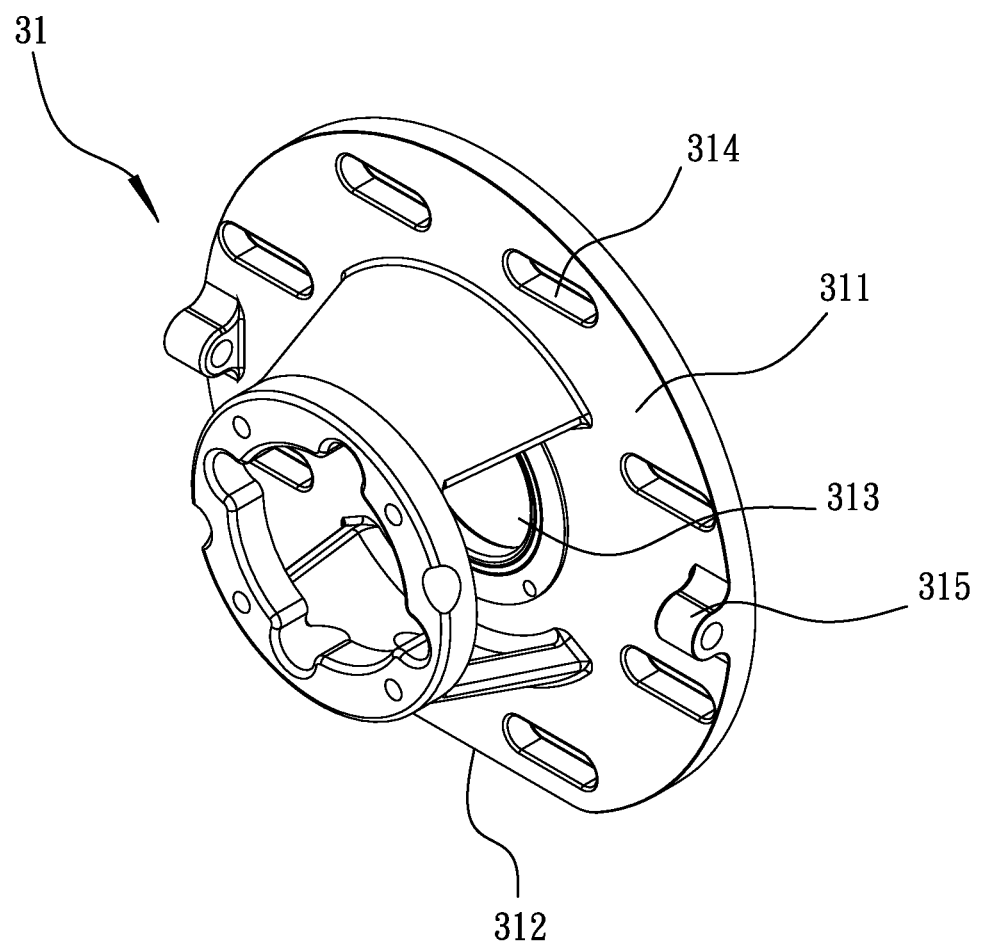
FIG. 2 is a schematic perspective view illustrating a position-adjustable bearing seat according to the present invention.
Figure 2A:
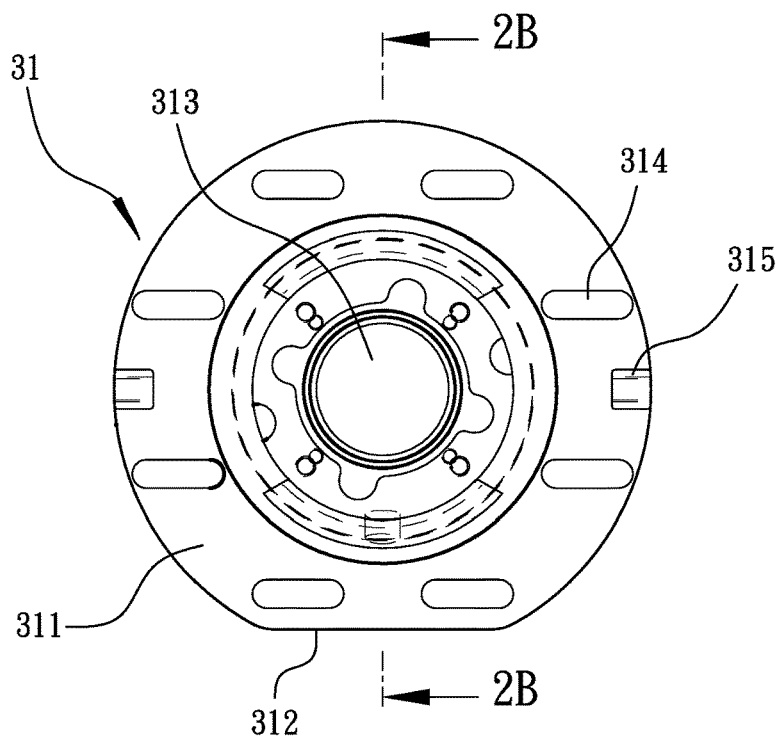
FIG. 2A is a front view of FIG. 2.
Figure 2B:
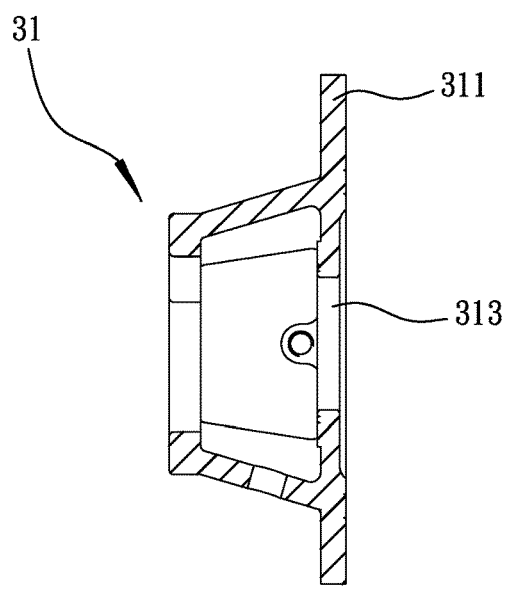
FIG. 2B is a cross-sectional view taken along line 2B-2B of FIG. 2A.

As shown in FIGS. 1A, 2, 2A, 2B, 3, 3A, and 3B, in a preferred embodiment of the present invention, the movable roller axle mounting device 3 comprises a position-adjustable bearing seat 31 and a hollow bearing seat base 32. As shown in FIGS. 2, 2A, and 2B, the position-adjustable bearing seat 31 comprises a disk 311, which is circular in shape. The disk 311 has a side forming or serving as a bearing seat in which a bearing is mounted and comprising a center hole 313. The disk 311 of the position-adjustable bearing seat 31 的 the disk 311 is formed with a plurality of elongate holes 314 arranged as a circular array around the center hole 313 and extending parallel and preferably in a horizontal direction. Optionally, a lug 315 is provided on each of two opposite side portions of the disk 311 to ease moving and adjusting the position-adjustable bearing seat 31 or to fix the position-adjustable bearing seat 31 in position against undesired or unexpected movement or displacement.

Figure 3:
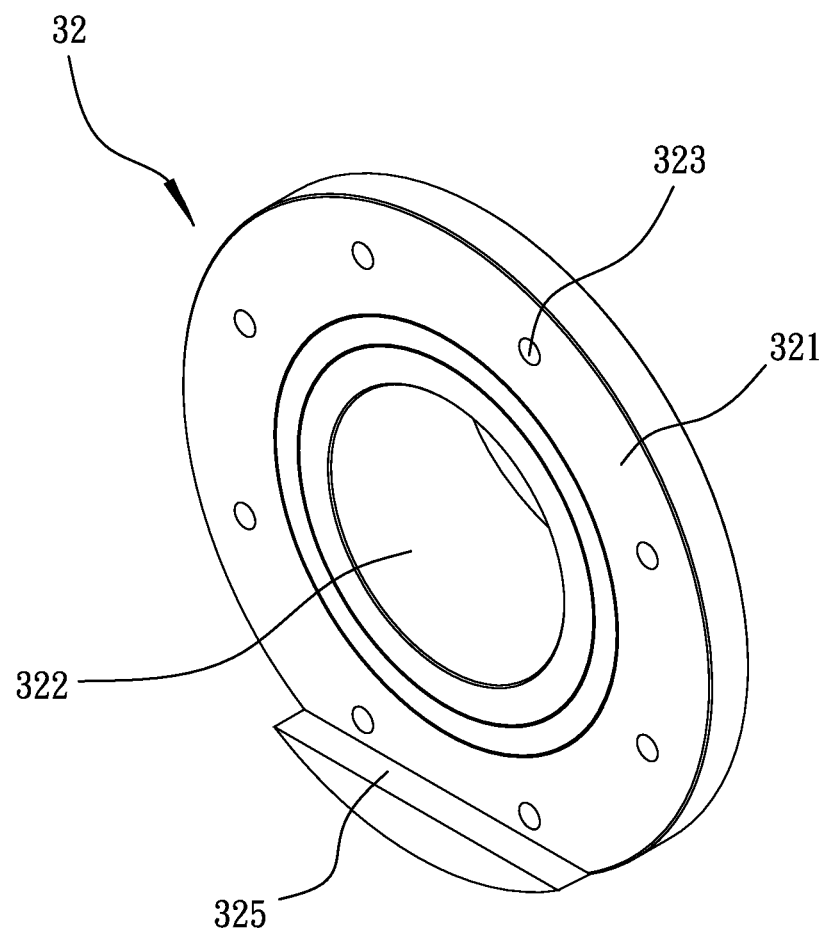
FIG. 3 is a schematic perspective view illustrating a position-adjustable bearing seat fixing structure according to the present invention.
Figure 3A:
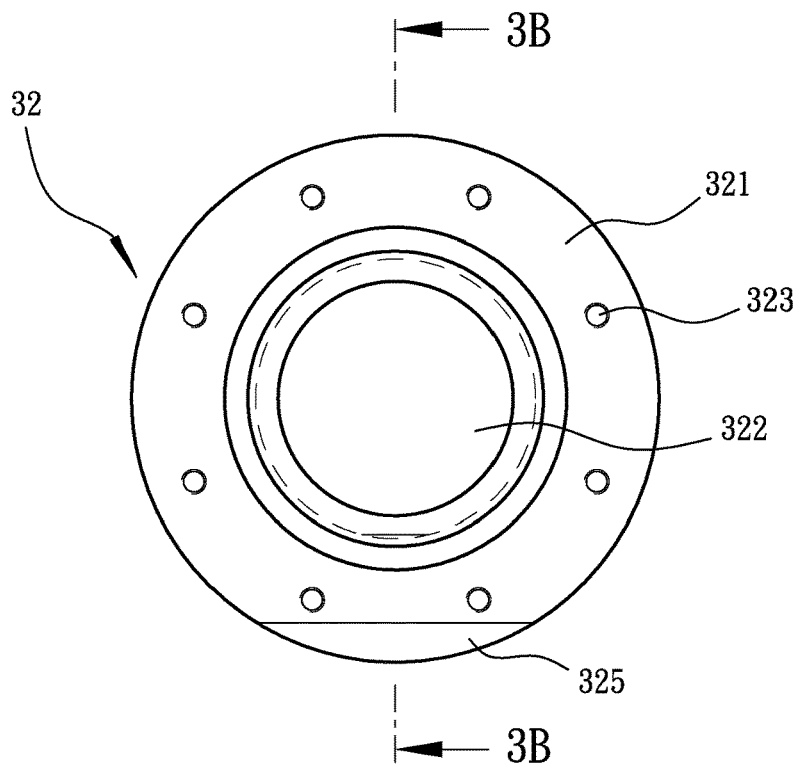
FIG. 3A is a front view of FIG. 3.
Figure 3B:
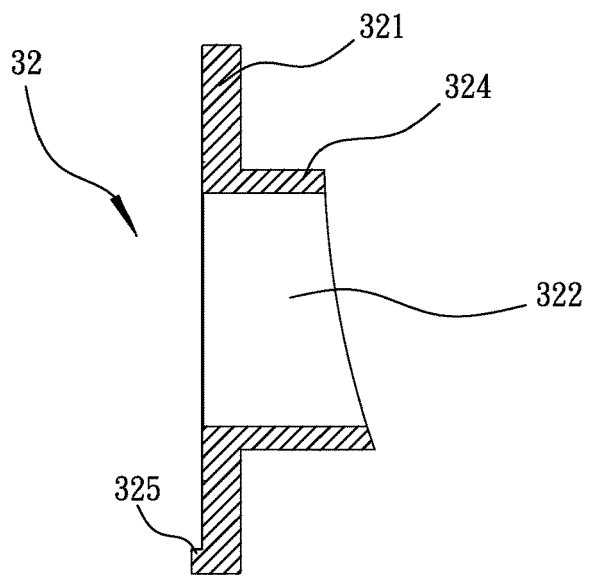
FIG. 3B is a cross-sectional view taken along line 3B-3B of FIG. 3A.

As shown in FIGS. 3, 3A, and 3B, according to the present invention, the hollow bearing seat base 32 comprises a fixed base 321 in the form of a circular disk and formed with a central hole 322 in a central portion thereof and extending completely therethrough. The fixed base 321 is formed with a plurality of circular holes 323 arranged as a circular array around the central hole 322. The circular holes 323 correspond, in number and position, to the elongate holes 314 of the position-adjustable bearing seat 31, so that when the position-adjustable bearing seat 31 and the hollow bearing seat base 32 are stacked on each other, the elongate holes 314 are respectively set in axial alignment with the circular holes 323 to allow fasteners to selectively fix them together. Further, the hollow bearing seat base 32 comprises a cylindrical portion 324 axially extending from one side thereof for mounting to the side wall of the machine body 1.

Further, a seal element, such as seal ring or gasket (not shown), may be provided between contact surfaces of the position-adjustable bearing seat 31 and the hollow bearing seat base 32, when they are stacked on each other, in order to provide a sealing effect between the contact surfaces of the position-adjustable bearing seat 31 and the hollow bearing seat base 32 to resist leaking of liquid or pressure.

The present invention uses the movable roller axle mounting devices 3 to mount the movable rotary axles 121 to the machine body 1 in a manner of being movable relative to the machine body 1. A feasible mounting arrangement comprises welding applied to the cylindrical portions 324 of the hollow bearing seat bases 32 to have the hollow bearing seat bases 32 securely combined with the machine body 1.

Distal ends of the rotary axles 121 of the movable roller 12A extend respectively through the central holes 322 of the hollow bearing seat bases 32, respectively, to further project outside the machine body 1, and the rotary axles 121 are then fixed, through bearings (not shown), to the position-adjustable bearing seats 31, respectively, to allow the rotary axles 121 to be freely rotatable in the center holes 313 with the bearings. Surfaces of the position-adjustable bearing seat 31 and the hollow bearing seat base 32 that face each other are fixed together by means of a plurality of bolts 33 extending through the circular holes 323 and the elongate holes 314, respectively, to be fastened with nuts 34. Further, the seal element provided between the contact surfaces of the position-adjustable bearing seat 31 and the hollow bearing seat base 32 may prevent undesired leaking of liquid or pressure. To ensure a relative horizontal movement between the position-adjustable bearing seat 31 and the hollow bearing seat base 32 for adjustment of an axle distance, the position-adjustable bearing seat 31 is provided with a horizontal rail 312, and the hollow bearing seat base 32 is provided with a horizontal rail support 325 to ensure a relative movement between them is carried out in a horizontal direction.

The present invention uses the movable roller axle mounting devices 3 to mount, in a movable manner, the movable rotary axles 121 to the machine body 1, and then an axle distance between the rotary axles 121 and the rotary axles 122 of the fixed roller 12B can be adjusted or varied. For example, as shown in FIG. 4, the position-adjustable bearing seat 31 and the hollow bearing seat base 32 can be so adjusted to have centers thereof completely coincide with each other. In case that the conveyor belt 11 has an excessively tight tension, the nuts 34 may be rotated and loosened to allow the position-adjustable bearing seat 31 and the rotary axle 121 to be moved rightward for a distance d to shorten the axle distance between the rotary axle 121 and the rotary axle 122, and then the nuts 34 may be fastened again (this being shown in FIG. 4B). Also, the lugs 315 provided on the two opposite side portions of the position-adjustable bearing seat 31 can be used for fixing, in any desired way, to prevent undesired leftward or rightward movement or displacement of the position-adjustable bearing seat 31 caused by unexpected or undesired loosening of the bolts 33. On the other hand, in case that the tension of the conveyor belt 11 get excessively loose or slackens due to wearing and abrasion, the nuts 34 may also be rotated and loosened to allow the position-adjustable bearing seat 31 and the rotary axle 121 to move or displace together in a leftward direction by a distance d to lengthen the axle distance between the rotary axle 121 and the rotary axle 122, and then, the nuts 34 are fastened again (this being shown in FIG. 4A). The elongate holes 314 may be provided with a lengthwise dimension that corresponds to a maximum range of adjustment of the axle distance. As such, an operator may efficiently and conveniently adjust or control the tension or tightness of the conveyor belt 11 outside the machine body and does not need to get into the interior space of the machine body to carry out the adjustment.

In alternative embodiment of the present invention, the fixed roller (and the mounting thereof to the machine body) can be structured and mounted in the same way as those of the movable roller (and the mounting thereof to the machine body) so that all rollers at the two ends of the conveyor belt are movable with respect to the machine body. Adjustment of the axle distance between the two rollers can be made by moving either one or both of the rollers.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. An axle distance adjustment device of a conveyor-driven fabric dyeing machine, comprising:
    a machine body, which has an interior space;
    one or multiple conveyor devices, which are arranged in the interior space of the machine body, the conveyor device or each of the conveyor devices comprising a conveyor belt in the form of an endless loop, a movable roller arranged at one end of the conveyor belt, and a fixed roller arranged at an opposite end of the conveyor belt, the fixed roller having rotary axles at two ends thereof and having two distal ends respectively coupled through bearings to bearing seats mounted to sidewalls of the machine body, the movable roller having rotary axles at two ends thereof and having two distal ends each of which is respectively coupled through a bearing to a position-adjustable bearing seat, the position-adjustable bearing seat being coupled to a hollow bearing seat base mounted to a side wall of the machine body, wherein the position-adjustable bearing seat is selectively attachable to the hollow bearing seat base at different positions so that the rotary axles of the movable roller are set at different axle distances with respect to the rotary axles of the fixed roller for adjustment of tightness of the conveyor belt,
    wherein the position-adjustable bearing seat comprises a first disk that is formed with at least one elongate hole and the hollow bearing seat base comprises a second disk that is formed with at least one circular hole, wherein the first disk is positionable, in a slidable manner, in surface contact with the second disk with the at least one elongate hole of the position-adjustable bearing seat in alignment with the at least one circular hole of the hollow bearing seat base, such that a fastener is receivable through the at least one elongate hole and the at least one circular hole to selectively fasten the position-adjustable bearing seat to the hollow bearing seat base.

2. The axle distance adjustment device of the conveyor-driven fabric dyeing machine according to claim 1, wherein installation of the fixed roller is alternatively made the same as installation of the movable roller, so that both rollers are movable and allow the axle distance therebetween to be adjusted through variation of positions thereof.

* * * * *